US011184363B2

(12) United States Patent
Scherman et al.

(10) Patent No.: US 11,184,363 B2
(45) Date of Patent: Nov. 23, 2021

(54) SECURING NETWORK-BASED COMPUTE RESOURCES USING TAGS

(71) Applicant: Microsoft Technology Licensing, LLC, Redmond, WA (US)

(72) Inventors: Mathias Abraham Marc Scherman, Tel Aviv (IL); Ben Kliger, Ramat Gan (IL); Evan Clarke Smith, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 327 days.

(21) Appl. No.: 16/236,826

(22) Filed: Dec. 31, 2018

(65) Prior Publication Data

US 2020/0213325 A1 Jul. 2, 2020

(51) Int. Cl.
*G06F 21/00* (2013.01)
*H04L 29/06* (2006.01)
*G06N 20/00* (2019.01)

(52) U.S. Cl.
CPC .......... *H04L 63/104* (2013.01); *G06N 20/00* (2019.01); *H04L 63/1425* (2013.01); *H04L 63/101* (2013.01)

(58) Field of Classification Search
CPC ..... H04L 61/2007; H04L 45/00; H04L 69/14; H04L 41/0846; H04L 43/0876; H04L 12/4625; H04L 63/1425; H04L 63/104; H04L 63/101; G06N 20/00
See application file for complete search history.

(56) References Cited

U.S. PATENT DOCUMENTS

| 10,904,271 | B2* | 1/2021 | Jusko ................. H04L 63/1416 |
| 2002/0075877 | A1* | 6/2002 | Tahan .................. H04L 63/104 |
| | | | 370/400 |
| 2020/0007395 | A1* | 1/2020 | Fainberg ............ H04L 41/0816 |

OTHER PUBLICATIONS

"International Search Report and Written Opinion Issued in PCT Application No. PCT/US2019/067695", dated Mar. 4, 2020, 11 Page.

* cited by examiner

*Primary Examiner* — Ghazal B Shehni
(74) *Attorney, Agent, or Firm* — Fiala & Weaver P.L.L.C.

(57) ABSTRACT

Embodiments described herein are directed to securing network-based compute resources. The foregoing may be achieved by determining a tag representative of non-malicious network addresses. The tag is determined by analyzing network data traffic received by a plurality of compute resources. Machine-learning based techniques may be used to automatically classify each network address that communicates with a particular compute resource as being malicious or non-malicious. Determined non-malicious network addresses for a particular compute resource are automatically associated with a tag. The tag is used to configure a firewall application to prevent access to a corresponding compute resource by malicious network addresses not represented by the tag. The number of non-malicious network addresses associated with a tag may be expanded by clustering compute resources having a similar set of network addresses that communicate therewith. The non-malicious network addresses determined for the clustered compute resources are combined and associated with a single tag.

20 Claims, 9 Drawing Sheets

SECURING NETWORK-BASED COMPUTE RESOURCES USING TAGS

BACKGROUND

Organizations, such as businesses, often provide web-based applications and services to their customers. Historically, the application and services were hosted on servers located "on-premises." However, the trend is shifting to using cloud computing platforms, which offer higher efficiently, greater flexibility, lower costs, and better performance relative to "on-premises" servers. Accordingly, organizations are shifting away from locally maintaining applications, services, and data and migrating to cloud computing platforms. This migration has gained the interest of malicious entities, such as hackers. Hackers may attempt to leverage the massive amount of computing resources provided by such platforms for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments described herein are directed to securing network-based compute resources. The foregoing may be achieved by determining a tag representative of a plurality of non-malicious network addresses. The tag may be determined by analyzing network data traffic received by a plurality of compute resources. For instance, machine-learning based techniques may be used to automatically classify each network address that communicates with a particular compute resource as being malicious or non-malicious. Such techniques enable network address classification to be carried out in an accurate, consistent, and efficient manner. Determined non-malicious network addresses for a particular compute resource are automatically associated with a tag. The tag may be used to configure a firewall application to prevent access to a corresponding compute resource by malicious network addresses not represented by the tag (rather than having to specify a long whitelist of non-malicious network addresses).

The intelligent decision-making performed by the machine learning-based techniques may be leveraged to expand the number of non-malicious network addresses associated with a particular tag. The number of non-malicious network addresses associated with a tag may be expanded by clustering compute resources having a similar set of network addresses that communicate therewith. The non-malicious network addresses determined for the clustered compute resources may be combined and associated with a single tag.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Figure 1:
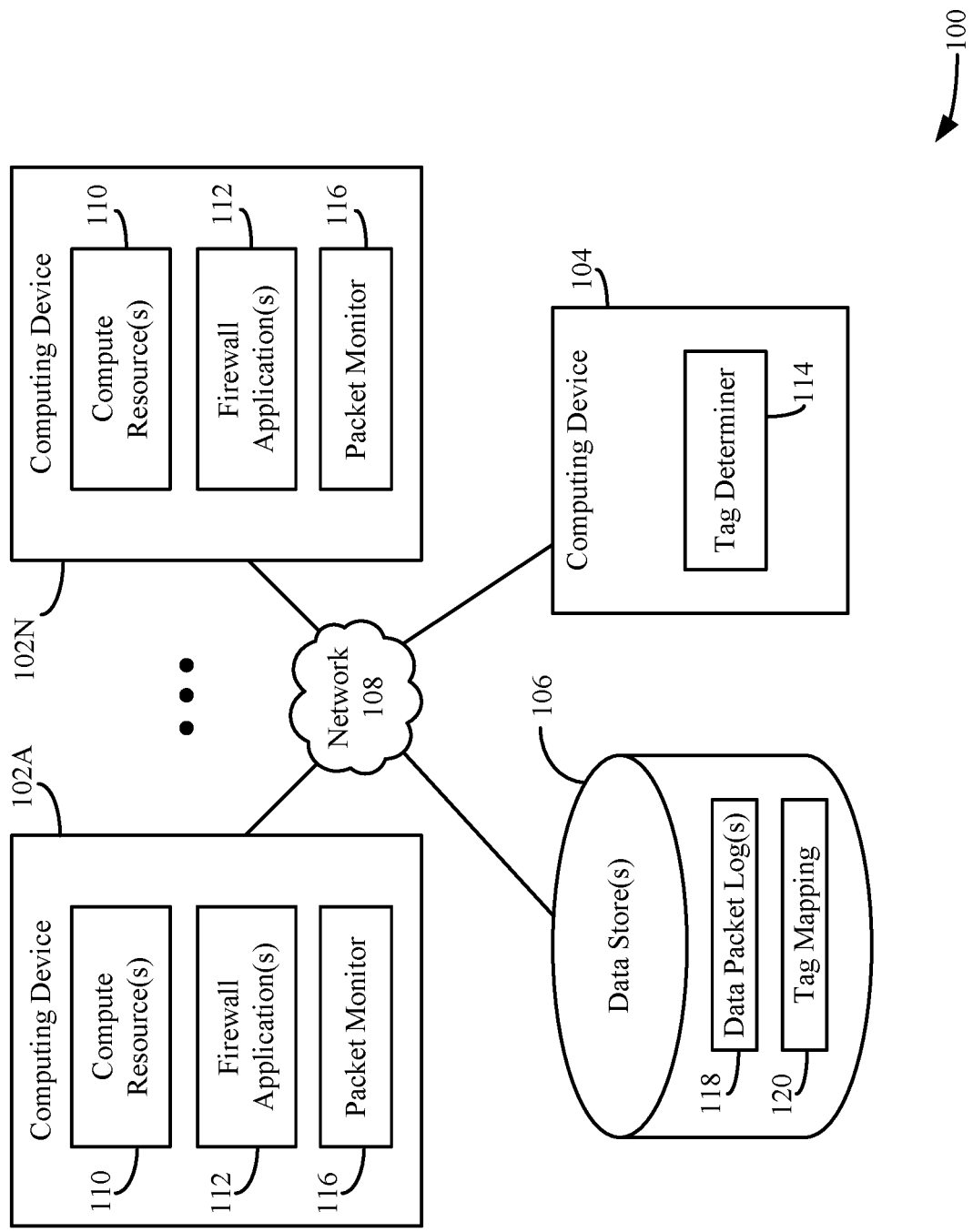
FIG. 1 is a block diagram of a system for determining a tag representative of a plurality of network addresses in accordance with an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. System and Method for Securing Network-Based Compute Resources Using Tags Embodiments described herein are directed to securing network-based compute resources. The foregoing may be achieved by determining a tag representative of a plurality of non-malicious network addresses. The tag may be determined by analyzing network data traffic received by a plurality of compute resources. For instance, machine-learning based techniques may be used to automatically classify each network address that communicates with a particular compute resource as being malicious or non-malicious. Such techniques enable network address classification to be carried out in an accurate, consistent, and efficient manner. Determined non-malicious network addresses for a particular compute resource are automatically associated with a tag. The tag may be used to configure a firewall application to prevent access to a corresponding compute resource by malicious network addresses not represented by the tag (rather than having to specify a long whitelist of non-malicious network addresses).

The intelligent decision-making performed by the machine learning-based techniques may be leveraged to expand the number of non-malicious network addresses associated with a particular tag. The number of non-malicious network addresses associated with a tag may be expanded by clustering compute resources having a similar set of network addresses that communicate therewith. The non-malicious network addresses determined for the clustered compute resources may be combined and associated with a single tag.

By more accurately determining which network addresses are non-malicious as opposed to which are malicious, the embodiments described herein improve the functioning of computers by ensuring that computers are not accessed from malicious network addresses, which can impair the functionality and performance of computers with malicious actions (including, but not limited to, consuming processing and memory resources, installing viruses and/or ransomware, enabling remote access for malicious entities, etc.). Likewise, by intelligently expanding the list of non-malicious network addresses, the embodiments described herein improves the functioning of computers by ensuring that such computers do not have their processing and memory resources compromised by malicious network addresses, thereby enabling such computers to perform its scheduled tasks using such resources.

Moreover, each of the firewall applications configured to protect a particular compute resource in the cluster may utilize the same tag. Each firewall application that uses that tag references the same tag mapping, which associates the tag to the plurality of non-malicious network addresses determined therefor. The tag mapping may be stored in a centrally-located data store, which is referenced by the plurality of firewall applications. Accordingly, each firewall application does not need to maintain and access a separate long whitelist of network addresses, but instead, simply references the same tag mapping. This advantageously improves the functioning of computers by reducing the amount of storage required to maintain the tags (and the associated non-malicious network addresses), and reduces the number of processing cycles required to determine whether a particular network address is non-malicious (or malicious).

FIG. 1 is a block diagram of a system 100 for determining a tag representative of a plurality of network addresses in accordance with an embodiment. As shown in FIG. 1, system 100 includes one or more computing devices 102A-102N, a computing device 104 and one or more data stores 106 communicatively coupled via a network 108. Data store(s) 106 may comprise one or more physical memory and/or storage device(s). Data store(s) 106 may be any type of physical memory and/or storage device that is described herein, and/or as would be understood by a person of skill in the relevant art(s) having the benefit of this disclosure. Network 108 may comprise one or more networks such as local area networks (LANs), wide area networks (WANs), enterprise networks, the Internet, etc., and may include one or more of wired and/or wireless portions.

Each of computing device(s) 102A-102N may be utilized by one or more users, including, but not limited to, a business, an organization, an enterprise, etc. As used herein, the term "enterprise" broadly refers to any of a wide variety of organization types, including businesses, non-profit organizations, and government agencies. Computing device(s) 102A-102N may be maintained in a cloud-based environment by a cloud-based service provider, although the embodiments described herein are not so limited. For example, computing device(s) 102A-102N may be a set of network-accessible servers, which may be co-located (e.g., housed in one or more nearby buildings with associated components such as backup power supplies, redundant data communications, environmental controls, etc.) to form a datacenter, or may be arranged in other manners. In accordance with such an embodiment, the entity that uses computing device(s) 102A-102N may be referred to as a tenant.

User(s) may utilize computing device(s) 102A-102N to allocate, modify, and/or deallocate one or more compute resources 110, build, manage, monitor, and/or launch applications (e.g., ranging from simple web applications to complex cloud-based applications), configure each of computing device(s) 102A-102N to operate as a particular server (e.g., a database server, an OLAP server, etc.), etc. Examples of compute resource(s) 110 include, but are not limited to one or more virtual machines, one or more storage disks included in and/or communicative coupled to computing device(s) 102A-102N, etc. Compute resource(s) 110 may be configured to execute and/or provide one or more applications or services (such as, but not limited to, a database server, an application server, etc.).

Compute resource(s) 110 may be made accessible to other user(s), such as end users or customers. To enable such user(s) to utilize such application(s) or service(s), computing device(s) 102A-102N may be configured to be accessible via an external network (or subnet) communicatively coupled to network 108, which communicatively couples computing device(s) 102A-102N to the computing devices utilized by the end users or customers.

However, enabling computing device(s) 102A-102N for communication with external network data traffic makes them susceptible to malicious attacks. To protect computing device(s) 102A-102N from such attacks, each of computing device(s) 102A-102N may be configured to execute one or more firewall application(s) 112. Each of firewall application(s) 112 may be configured to monitor and control incoming and outgoing network traffic to a particular compute resource of compute resource(s) 110 in accordance with one or more manually-configured security rules. For instance, a user may manually create security rule(s) that specify a list (also known as a whitelist) of trusted (or non-malicious) network addresses (e.g., internet protocol (IP) addresses). Any network data received from such network addresses is allowed access to the corresponding compute resource of compute resource(s) 110. Any network data received from network addresses not included in the whitelist is prevented from accessing the corresponding compute resource of compute resource(s) 110.

Given that hundreds or even thousands of compute resource(s) 110 may be made available to end users, and given that network data may be received from any number of network addresses, correctly configuring the corresponding hundreds or thousands of firewall application(s) 112 to filter out network traffic from untrusted (or malicious) network addresses is nearly an impossible task, thereby leaving computing device(s) 102A-102N vulnerable to malicious attacks.

Embodiments described herein provide a more effective and simplified technique for configuring firewall application(s) 112. In particular, a tag determiner 114 (shown executing on computing device 104) may determine a tag representative of a list of trusted (or non-malicious) network addresses for each of compute resource(s) 110 of computing device(s) 102A-102N. When configuring a corresponding firewall application of firewall application(s) 112, the determined tag is specified rather than specifying each and every non-malicious network address.

To determine the tag(s), tag determiner 114 may analyze network data packets received by each of compute resource(s) 110 from a plurality of network addresses. For instance, each of computing device(s) 102A-102N may execute a packet monitor 116. Packet monitor 116 may be configured to monitor network data packets received by compute resource(s) 110 of its respective computing device of computing device(s) 102A-102N and store one or more characteristics of the data packets in one or more data packet logs 118 generated thereby. As shown in FIG. 1, data packet log(s) 118 may be stored in data store(s) 106. The characteristic(s) specified by data packet log(s) 118 may include, but are not limited to, the network addresses that transmitted the data packets, the network addresses of computing device(s) 102A-102N and/or compute resource(s) to which the data packets were transmitted, the size of the data packets, the time at which the data packets were transmitted and/or received, one or more flags associated with each of the data packets (e.g., a SYN flag, an ACK flag, a FIN flag, an URG flag, a PSH, flag, a RST flag, etc.), etc. In accordance with an embodiment, the monitoring of data packets, the characteristics of the data packets and/or the formatting of data packet log(s) 118 may be in accordance with the IPFIX (Internet Protocol Flow Information Export) protocol. It is noted that while packet monitor 116 is shown executing on each of computing device(s) 102A-102N, packet monitor 116 may be executing on a centrally-located computing device (e.g., computing device 104) that monitors traffic transmitted to each of computing device(s) 102A-102N.

Tag determiner 114 may analyze data packet log(s) 118 and determine one or more features (e.g., patterns and/or sequences of network data packets) associated with each network address from which the packets were transmitted. For each of compute resource(s) 110, tag determiner 114 may determine whether each network address that communicated therewith is a malicious or non-malicious network address based on the analysis. In accordance with an embodiment, tag determiner 114 utilizes machine-learning based techniques to determine whether a network address is malicious or non-malicious.

The network addresses determined to be non-malicious for a particular compute resource of compute resource(s) 110 may be associated with a tag. Tag determiner 114 may be configured to generate a tag mapping 120, which may be a data structure (e.g., a table) that associates the determined plurality of non-malicious network addresses to the tag. Tag mapping 120 may be generated for each tag determined for a particular compute resource of compute resource(s) 110. As shown in FIG. 1, tag mapping 120 be stored in data store(s) 106.

When configuring firewall application(s) 112, the tag(s) may be specified, rather than a long list of network addresses. Firewall application(s) 112 may utilize tag mapping 120 to determine which network addresses are to be provided access to a corresponding compute resource of compute resource(s) 110 based on the specified tag(s).

In accordance with an embodiment, a set of non-malicious network addresses determined for a particular compute resource of compute resource(s) 110 may be determined based on a clustering technique that clusters compute resource(s) 110 based on the similarity of non-malicious network addresses determined for each cluster. By doing so, the number of network addresses that are authorized to access a particular compute resource of compute resource(s) 110 may be increased. Moreover, the total number of non-malicious network addresses associated with a particular may be increased, thereby reducing the total number tag(s) to be maintained and that are used to configure firewall application(s) 112. Additional details regarding the foregoing techniques are described below.

Figure 2:
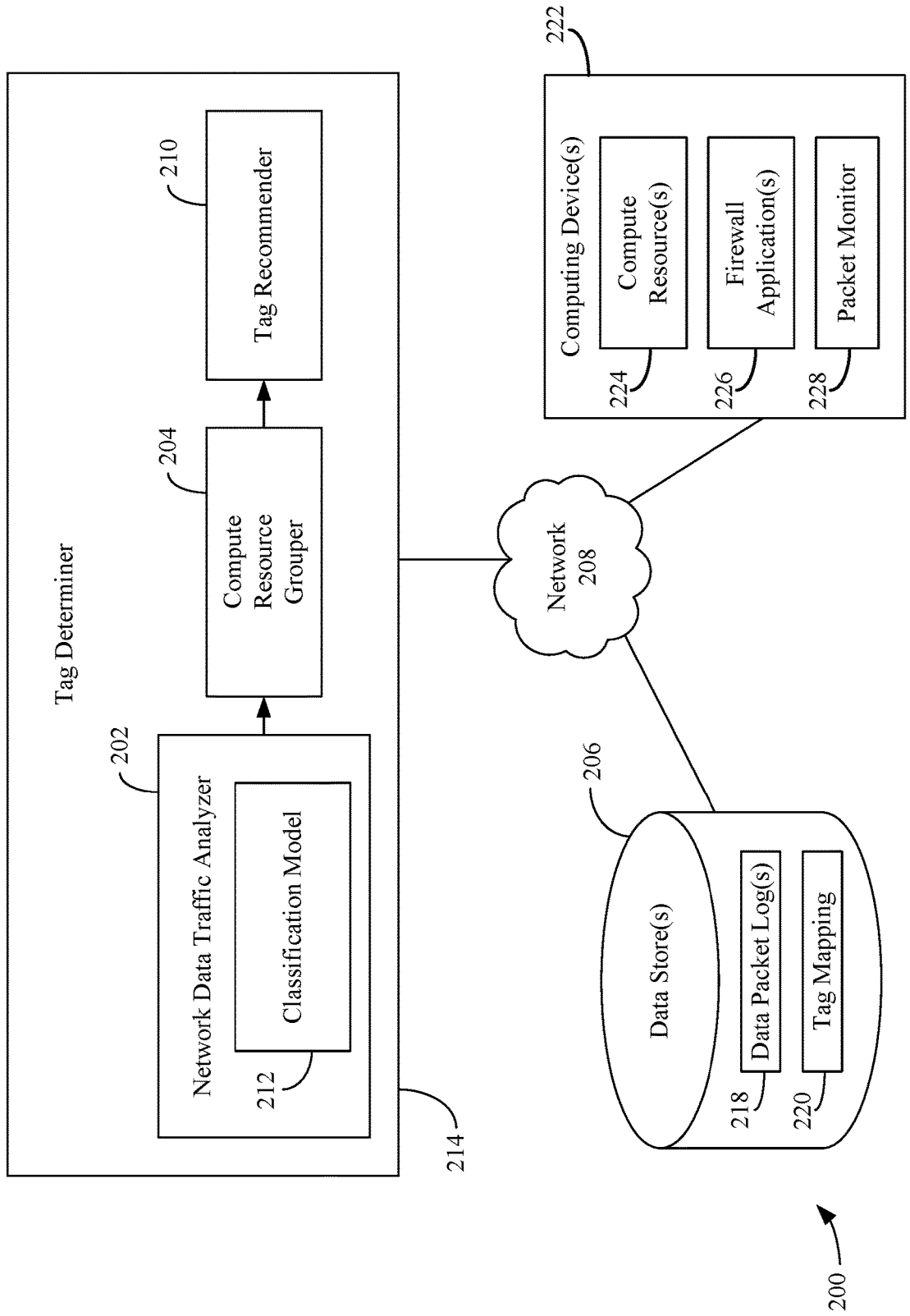
FIG. 2 is a block diagram of a system for determining a tag representative of a plurality of network addresses in accordance with another example embodiment.

FIG. 2 is a block diagram of a system 200 for determining a tag representative of a plurality of network addresses in accordance with another example embodiment. As shown in FIG. 2, system 200 includes a tag determiner 214, data store(s) 206, and computing device(s) 222 communicatively coupled via a network 208. Tag determiner 214, data store(s) 206, network 208, and computing device(s) 222 are examples of tag determiner 114, data store(s) 106, network 108, and computing device(s) 102A-102N, as respectively described above with reference to FIG. 1. As shown in FIG. 2, tag determiner 214 includes a network data traffic analyzer 202, a compute resource grouper 204, and a tag recommender 210. As also shown in FIG. 2, data store(s) 206 include data packet log(s) 218 and tag mapping 220. Data packet log(s) 218 and tag mapping 220 are examples of data packet log(s) 118 and tag mapping 120, as respectively described above with reference to FIG. 1. As further shown in FIG. 2, computing device(s) 222 comprises compute resource(s) 224, firewall application(s) 226, and a packet monitor 228. Compute resource(s) 224, firewall application(s) 226, and packet monitor 228 are examples of compute resource(s) 110, firewall application(s) 112, and packet monitor 116.

Network data traffic analyzer 202 may analyze network data packets received by each of compute resource(s) 224. For instance, network data traffic analyzer 202 may analyze data packet log(s) 218 (e.g., generated by packet monitor 228), which specify characteristics of the network data received by each of compute resource(s) 224. The characteristic(s) specified by data packet log(s) 218 may include, but are not limited to, the network addresses that transmitted the data packets, the network addresses of computing device(s) 222 and/or compute resource(s) 224 to which the data packets were transmitted, the size of the data packets, the time at which the data packets were transmitted and/or received, one or more flags associated with each of the data packets, etc. In accordance with an embodiment, the monitoring of data packets, the characteristics of the data packets and/or the formatting of the data packet log(s) 218 may be in accordance with the IPFIX protocol.

Network data traffic analyzer 202 may analyze data packet log(s) 218 and determine one or more features associated with each network address from which the packets were transmitted. Such features may include, but are not limited to, the number of compute resources that each network address transmits packets to, the ports that the network address uses to communicate with each of compute resource(s) 224, the size of the packets transmitted by each network address, the frequency at which packets are transmitted by each network address, the flags used when transmitting data packets, etc.

For each of compute resource(s) 224, tag determiner 214 may determine whether each network address that communicated therewith is a malicious or non-malicious network address based on the features. Network data traffic analyzer 202 may utilize machine-learning based techniques to determine whether a network address is malicious or non-malicious. For example, network data traffic analyzer 202 may train a machine learning algorithm to generate a classification model 212. The machine learning algorithm may be trained using one or more identified patterns of network data packets that are known to be malicious and/or identified pattern(s) of network data patterns that are known to be non-malicious (benign). The identified, malicious patterns of network data and/or identified, non-malicious patterns of network data may be obtained based on an analysis of network packet logs collected for compute resources associated with other users (e.g., other tenants) that utilize well-configured firewall application(s) for their respective compute resources. A well-configured firewall application may be defined as a firewall application for which at least one trusted network address has been specified (i.e., a firewall application that is configured to allow access to a corresponding compute resource to at least one specified, trusted network address). Network traffic patterns associated with trusted network addresses may be identified as non-malicious patterns, and network traffic patterns associated with non-trusted network addresses may be identified as malicious patterns.

Figure 3:
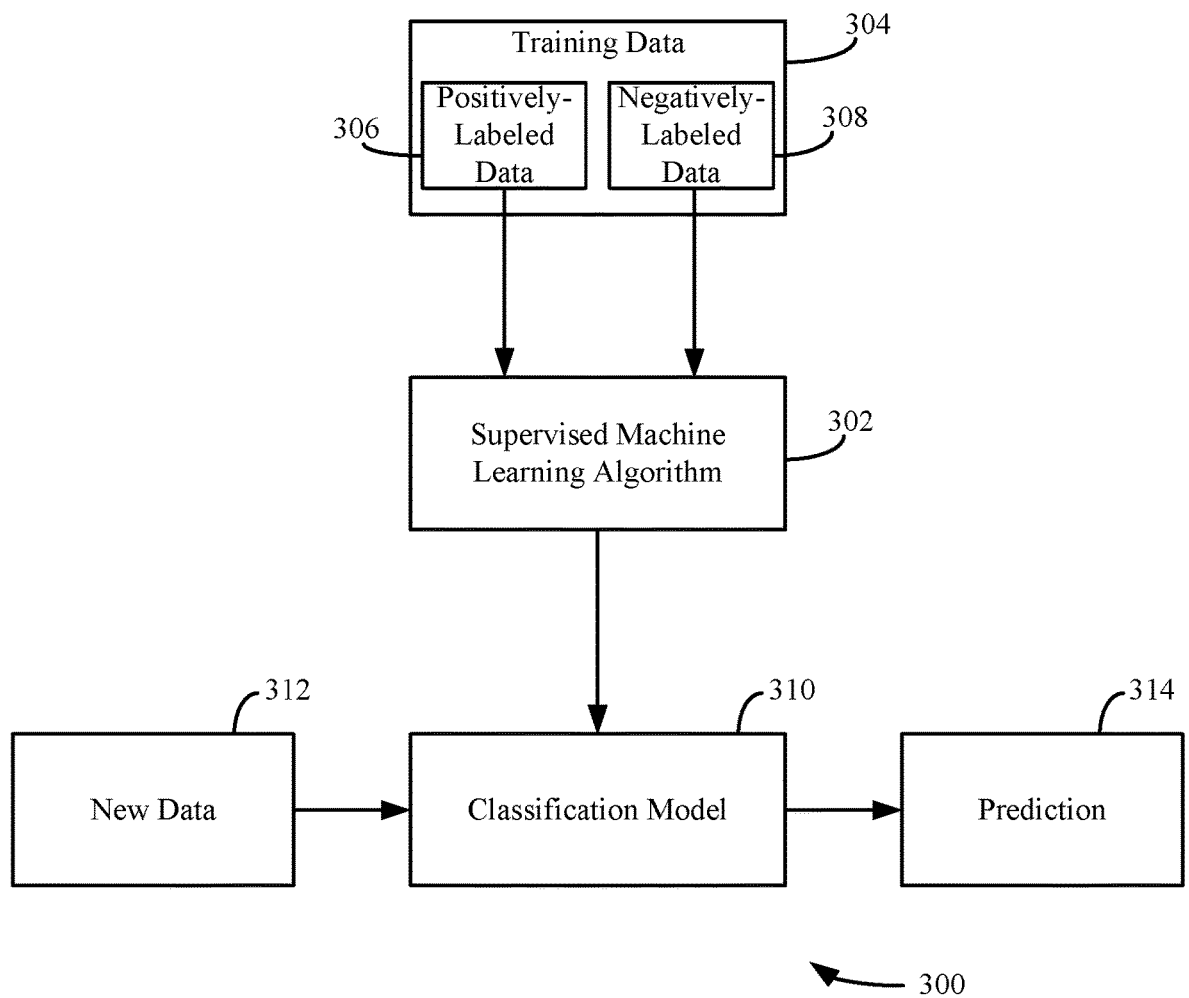
FIG. 3 is a block diagram depicting a supervised machine learning algorithm in accordance with an example embodiment.

In accordance with an embodiment, the machine learning algorithm may be a supervised machine learning algorithm. In accordance with such an embodiment, the machine learning algorithm learns what constitutes a malicious network data pattern using the identified patterns that are known to be malicious and/or the identified patterns that are known to be non-malicious. For instance, FIG. 3 is a block diagram depicting a supervised machine learning algorithm 302 in accordance with an embodiment. Network data traffic analyzer 202 may comprise supervised machine learning algorithm 302. Network data traffic analyzer 202 may provide training data 304 to supervised machine learning algorithm 302. Training data 304 may comprise positively-labeled data 306 and negatively-labeled data 308. Positively-labeled data 306 may comprise malicious patterns of network traffic, and negatively-labeled data 308 may comprise non-malicious patterns of network traffic, or vice versa. Both of the malicious and non-malicious patterns may be identified via analyzing data packet log(s) associated with other users. Positively-labeled data 306 is provided as a first input to supervised machine learning algorithm 302, and negatively-labeled data 308 is provided as a second input to supervised machine learning algorithm 302. Using these inputs, supervised machine learning algorithm 302 learns what constitutes a malicious pattern (or non-malicious pattern) of network data and generates a classification model 310 that is utilized to classify network addresses as being malicious or non-malicious based on the network traffic patterns exhibited thereby. Classification model 310 is an example of classification model 212, as shown in FIG. 2. aight For instance, to classify a particular network address, the features of the network address (shown as new data 312) determined by network data traffic analyzer 202 is provided to classification model 310. Classification model 310 may output an indication (e.g., a prediction 314) as to whether the inputted features (i.e., new data 312) are indicative of malicious (or non-malicious) network data traffic.

In accordance with an embodiment, prediction 314 outputted by classification model 310 is a probability that a particular network address is malicious (or non-malicious). Network data traffic analyzer 202 may compare the probability to a threshold. If the probability exceeds the threshold, network data traffic analyzer 202 may determine that the network address is malicious. If the probability does not exceed the threshold, network data traffic analyzer 202 may determine that the network address is non-malicious.

Figure 4A:
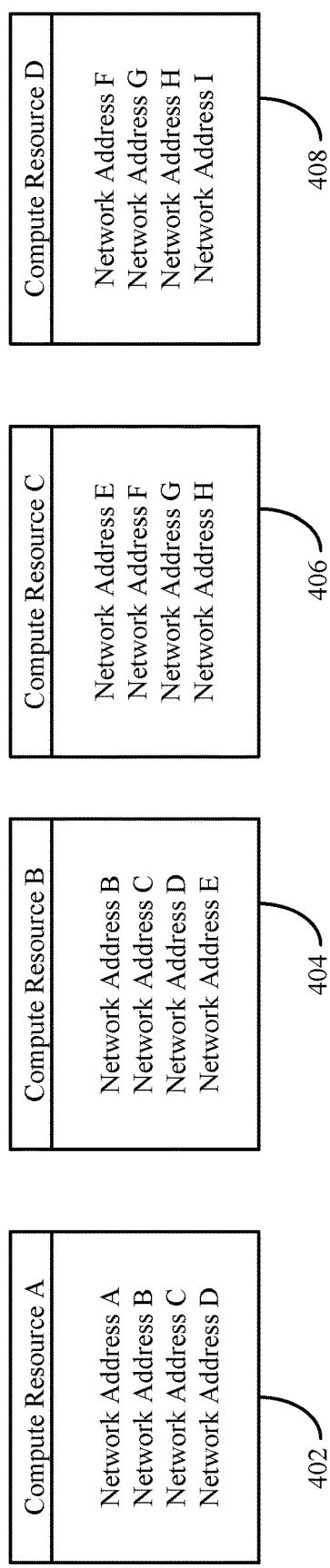
FIGS. 4A-4C depict a plurality of subsets of a plurality of network addresses determined for different compute resources in accordance with an example embodiment.
Figure 4B:
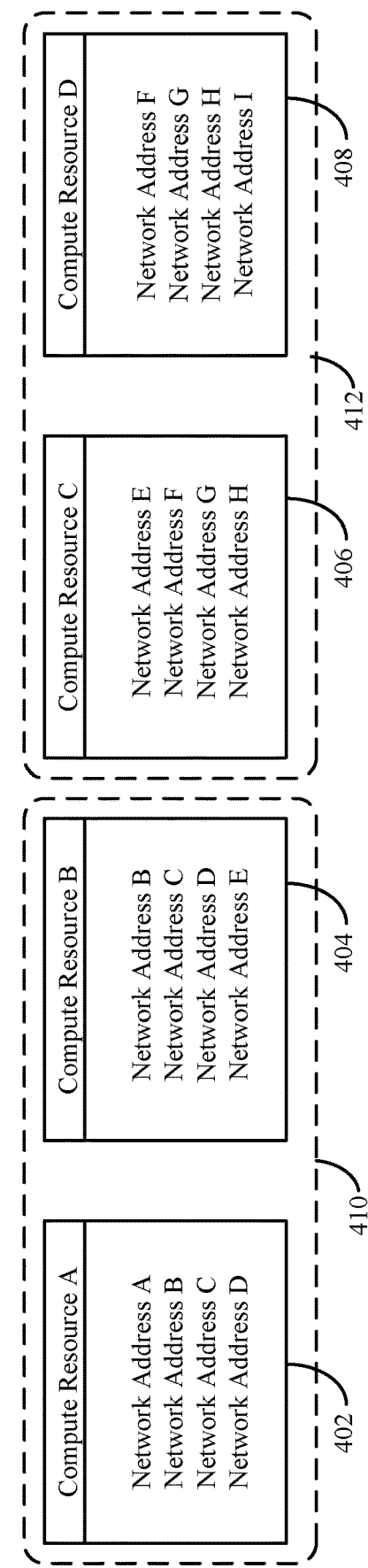
Figure 4C:
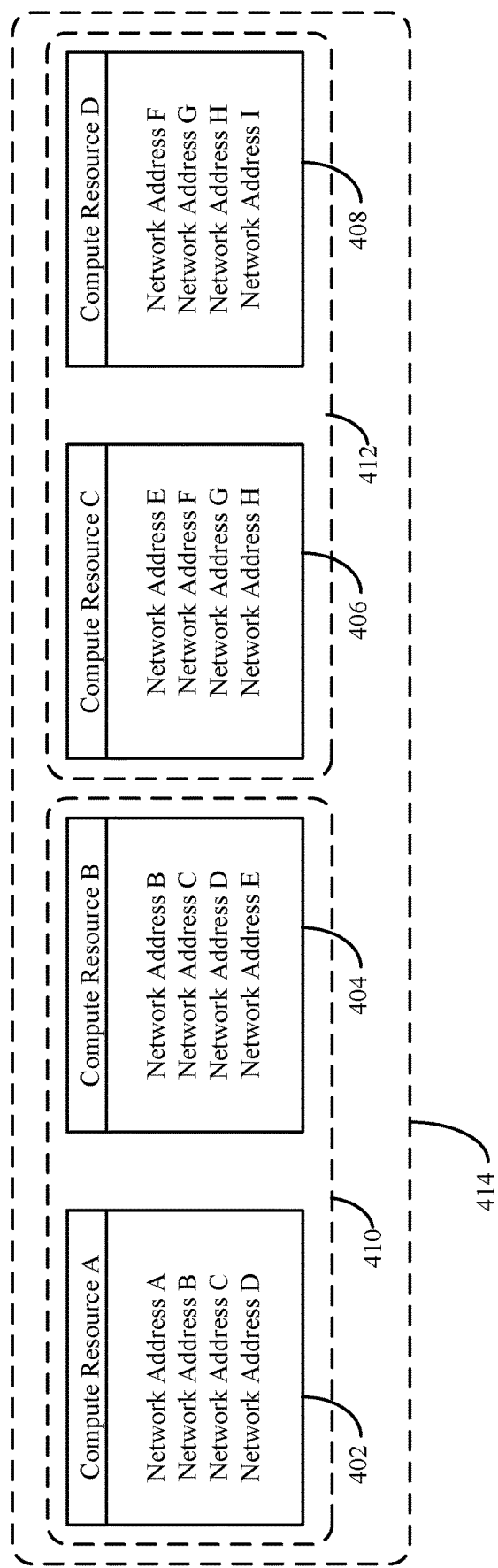

The foregoing technique may be performed for each network address that communicates with a particular compute resource. The result is, for each compute resource, a subset of the plurality of network addresses that communicated with the compute resource that are determined to be non-malicious. For instance, FIGS. 4A-4C depict a plurality of subsets 402, 404, 406, and 408 of a plurality of network addresses determined for different compute resources in accordance with an example embodiment. Each of subsets 402, 404, 406, and 408 specify the plurality network addresses that have been determined to be non-malicious for its corresponding compute resource. As shown in FIG. 4A, subset 402 specifies that network addresses A-D were determined to be non-malicious for compute resource A, subset 404 specifies that network addresses B-E were determined to non-malicious for compute resource B, subset 406 specifies that network addresses E-H were determined to be non-malicious for compute resource C, and subset 408 specifies that network addresses F-I were determined to be non-malicious for compute resource D.

Compute resource grouper 204 may be configured to group the plurality of compute resources into clusters based on a measure of similarity between the network addresses associated with their respective subsets. For example, the measure of similarity may be based on a number of network addresses in the subsets that are the same. For instance, if the number of same network addresses associated with different compute resources exceeds a particular first threshold, then compute resource grouper 204 may group those compute resources. For example, suppose the threshold is two. In the example shown in FIG. 4A, compute resources A and B are both associated with three same network addresses (network addresses B, C, and D), and compute resources C and D are both associated with three of the same network addresses (network addresses F, G, and H). Accordingly, compute resource grouper 204 may group compute resources A and B into a first cluster and may group compute resources C and D into a second cluster. For example, as shown in FIG. 4B, compute resources A and B are grouped into a first cluster 410, and compute resources C and D are grouped into a second cluster 412. Compute resource grouper 204 may then combine (e.g., perform a union of) the network addresses associated with each of compute resource A and B to generate a set of network addresses that is associated with cluster 410 (i.e., network addresses A-E) and generate a set of network addresses that is associated with cluster 412 (i.e., network addresses E-I). By determining a set of network addresses based on a measure of similarity, as described above, the number of non-malicious network addresses associated for a particular compute resource is expanded, thereby resulting in a more robust firewall configuration.

In accordance with an embodiment, the measure of similarity may also be based on a distance metric, where a distance between network addresses of different subsets is determined. If the distance between the network addresses is within a particular second threshold, then those network addresses may be determined to be similar. If the distance between the network addresses is not within the particular threshold, those network addresses are determined to be not similar. The distance between network addresses may be determined based on a comparison of bits that comprise the addresses. For instance, each of network addresses may be a 32-bit value, which is grouped into four 8-bit values (referred to as octets). The last two octets identify a host (e.g., a computer), and the first two octets identify the network on which the host belongs. Network addresses belonging to the same network, but having different hosts, may be determined to be similar (i.e. the values of at least the first two octets are the same), whereas network addresses belonging to the different networks may be determined to be not similar (i.e., the values of at least one of the first octet or the second octet are not the same). It is noted that the foregoing technique is purely exemplary and that other similarity determination schemes may be utilized.

Some network addresses in the set of network addresses associated with a particular cluster may not be associated with each compute resource of that cluster. Such network addresses may be referred to as "noisy" network addresses. For instance, with reference to FIG. 4B, network address A is associated with compute resource A (but not compute resource B), and network address E is associated with compute resource B (but not compute resource A). In accordance with an embodiment, if the number of "noisy" network addresses in the set exceeds a particular threshold, the cluster may be determined to be too noisy, and the cluster is deallocated (i.e., the compute resources of that cluster are ungrouped). If the number of "noisy" network addresses in the set does not exceed the particular threshold, the cluster is maintained.

Referring again to FIG. 2, tag recommender 210 may generate and output a tag for each set of network addresses determined for a particular cluster. For instance, with reference to FIG. 4B, tag recommender 210 generates and outputs a first tag that is representative of network addresses A-E and generates and outputs a second tag that is representative of network addresses E-I. Tag recommender 210 may be configured to generate a tag mapping 220, which may be a data structure (e.g., a table) that associates each determined set of plurality of network addresses to a particular tag.

The determined tags may be displayed to a user via a user interface (e.g., a graphical user interface). The user interface may further display the set of network addresses associated with each tag, along with the compute resource(s) associated with the set. The user may configure firewall application(s) 226 associated with compute resource(s) 224 using the tag(s). For example, when configuring firewall application(s) 226 associated with compute resources A and B, the user may specify the first tag. When configuring firewall application(s) 226 associated with compute resources C and D, the user may specify the second tag. Accordingly, the user is not required to specify each and every network address for each and every firewall application.

When receiving network data traffic from a particular network address, the corresponding firewall application of firewall application(s) 226 may determine whether the network address is associated with the tag(s) specified therefor by referencing tag mapping 220 and determine whether or not access to the corresponding compute resource is to be allowed for the network address.

In accordance with an embodiment, the user interface may enable the user to automatically configure firewall application(s) 226 to utilize the determined tags. For instance, the user may interact with a user interface element, which, when activated, causes tag recommender 210 to configure each of firewall application(s) 226 to utilize tag(s) associated with its compute resource(s) 222. For example, tag recommender 210 may send a command specifying the tag(s) to firewall application(s) 226 (e.g., via network 208) that causes firewall application(s) 226 to utilize the tag(s). In accordance with another embodiment, tag recommender 210 automatically configures firewall application(s) 226 without requiring the user to provide any input.

Each of firewall application(s) 226 may reference the same tag mapping (i.e., tag mapping 220). Accordingly, each of firewall application(s) 226 does not need to maintain its own mapping or whitelist of network addresses, thereby advantageously reducing the amount of memory and processing cycles required to protect compute resource(s) 224 from malicious network data traffic.

In accordance with an embodiment, compute resource grouper 204 groups clusters into cluster groups based on another measure of similarity. By doing so, the total number of recommended tags is reduced, thereby advantageously saving additional memory and processing cycles. For example, the measure of similarity may be based on a number of network addresses in each set of network addresses determined for different clusters. For instance, if the number of same network addresses associated with different sets reaches or exceeds a particular threshold, then compute resource grouper 204 may group those clusters into a cluster group. For example, suppose the threshold is one. In the example shown in FIG. 4C, cluster 412 and cluster 414 are both associated with one same network address (network addresses E). Accordingly, compute resource grouper 204 may group cluster 410 and cluster 412 into a cluster group 414. Compute resource grouper 204 may then combine (e.g., perform a union of) the network addresses associated with each of clusters 410 and 412 to generate a another set of network addresses that is associated with cluster group 414 (i.e., network addresses A-I). By determining another set of network addresses based on another measure of similarity, as described above, the number of non-malicious network addresses associated for a particular compute resource is further expanded, thereby resulting in an even more robust firewall configuration.

In accordance with an embodiment, the measure of similarity may also be based on a distance metric, where a distance between network addresses of different clusters is determined. If the distance between the network addresses is with within a particular threshold, then those network addresses may be determined to be similar. If the distance between the network addresses is not within the particular threshold, those network addresses are determined to be not similar. The distance between network addresses may be determined based on a comparison of bits that comprise the addresses in a similar manner as described above.

Some network addresses in the set of network addresses associated with a particular cluster group may not be associated with each cluster of that cluster group. Such network addresses may also be referred to as "noisy" network addresses. In accordance with an embodiment, if the number of "noisy" network addresses in the set of network addresses determined for the cluster group exceeds a particular threshold, the cluster group may be determined to be too noisy, and the cluster group is deallocated (i.e., the clusters of that cluster group are ungrouped). If the number of "noisy" network addresses in the set does not exceed the particular threshold, the cluster group is maintained.

The determined tags may be displayed to a user via a user interface in accordance with the embodiments described above. The tag determined for the compute resources included in a cluster group (e.g., compute resources A-D) may be used to configure firewall application(s) 226 associated therewith. Firewall application(s) 226 may be configured to use the tag in accordance with the embodiments described above.

Figure 5:
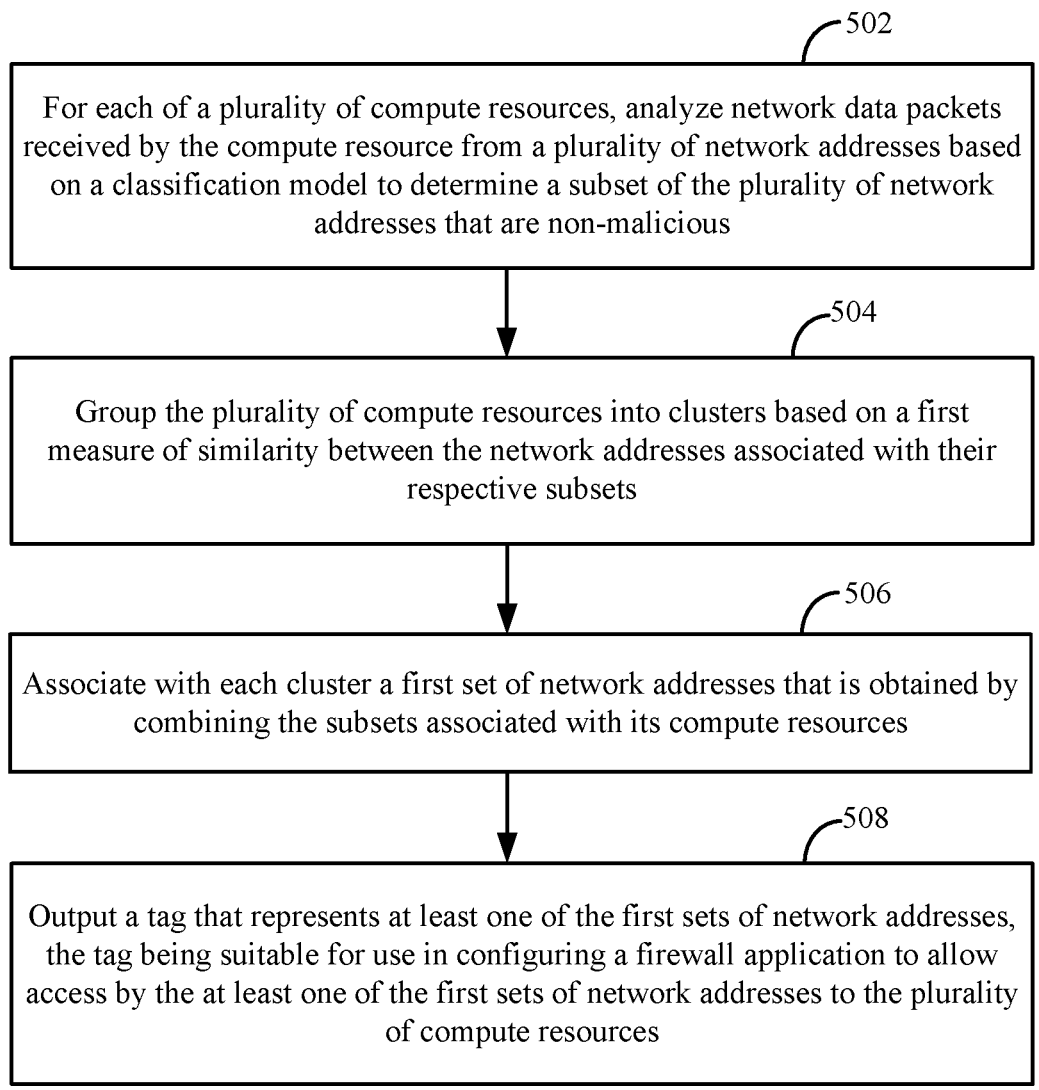
FIG. 5 depicts a flowchart of an example method for determining a tag representative of a plurality of non-malicious network addresses in accordance with an example embodiment.

Accordingly, a tag representative of a plurality of non-malicious network address may be determined in many ways. For example, FIG. 5 depicts a flowchart 500 of an example method for determining a tag representative of a plurality of non-malicious network addresses in accordance with an example embodiment in accordance with an example embodiment. The method of flowchart 500 will now be described with continued reference to system 200 of FIG. 2, although the method is not limited to that implementation. Other structural and operational embodiments will be apparent to persons skilled in the relevant art(s) based on the discussion regarding flowchart 500 and system 200 of FIG. 2.

As shown in FIG. 5, the method of flowchart 500 begins at step 502, in which, for each of a plurality of compute resources, network data packets received by the compute resource from a plurality of network addresses are analyzed based on a classification model to determine a subset of the plurality of network addresses that are non-malicious. For example, with reference to FIG. 2, network data traffic analyzer 202 may, for each of compute resource(s) 224, analyze network data packets received by the compute resource from a plurality of network addresses based on classification model 212 to determine a subset of the plurality of network addresses that are non-malicious.

In accordance with one or more embodiments, analyzing network data packets based on a classification model comprises determining one or more features associated with each of the plurality of network addresses based on the analysis of network data packets, providing the one or more features to the classification model, and receiving an output generated by the classification model that indicates whether each of the plurality of network addresses is non-malicious or malicious based on the one or more features. For example, with reference to FIG. 2, network data traffic analyzer 202 determines one or more features associated with each of the plurality of network addresses based on the analysis of network data packets, provides the one or more features to classification model 212, and receives an output generated by classification model 212 that indicates whether each of the plurality of network addresses is non-malicious or malicious based on the one or more features.

In accordance with one or more embodiments, the classification model may be determined in accordance with flowchart 600, which is described below with reference to FIG. 6.

At step 504, the plurality of compute resources is grouped into clusters based on a first measure of similarity between the network addresses associated with their respective subsets. For example, with reference to FIG. 2, compute resource grouper 204 groups compute resource(s) 224 into clusters based on a first measure of similarity between the network addresses associated with their respective subsets. For instance, as shown in FIG. 4B, compute resource grouper 204 may group compute resource A and compute resource B into first cluster 410 and group compute resource C and compute resource D into second cluster 412 based on a first measure of similarity.

In accordance with one or more embodiments, the first measure of similarity is based on a number of network addresses in the subsets that are the same or within a distance metric. In accordance with such embodiment(s), the plurality of compute resources is grouped into clusters based on whether the number of network addresses in the subsets that are the same or within the distance metric exceeds a threshold. For example, with reference to FIG. 2, compute resource grouper 204 may group compute resource(s) 224 into clusters (e.g., clusters 410 and 412, as shown in FIG. 4B) based on whether the number of network addresses in the subsets that are the same or within the distance metric exceeds a threshold.

In accordance with one or more embodiments, the plurality of compute resources is grouped based on the number of "noisy" network addresses included in the respective subsets. Additional details regarding such a grouping technique is described below with reference to FIG. 7

At step 506, a first set of network addresses that is obtained by combining the subsets associated with its compute resources is associated with each cluster. For example, with reference to FIG. 2, compute resource grouper 204 may associate, with each cluster, a first set of network addresses that is obtained by combining the subsets associated with its compute resources. For instance, with reference to FIG. 4B, compute resource grouper 204 may associate cluster 410 with network addresses A-E and associated cluster 412 with network addresses E-I.

At step 508, a tag that represents at least one of the first sets of network addresses is outputted, the tag being suitable for use in configuring a firewall application to allow access by the at least one of the first sets of network addresses to the plurality of compute resources. For example, with reference to FIG. 2, tag recommender 210 may output a tag that represents at least one of the first sets of network addresses, the tag being suitable for use in configuring a corresponding firewall application of firewall application(s) 226 to allow access by the at least one of the first sets of network addresses to a corresponding compute resource of compute resource(s) 224.

Figure 6:
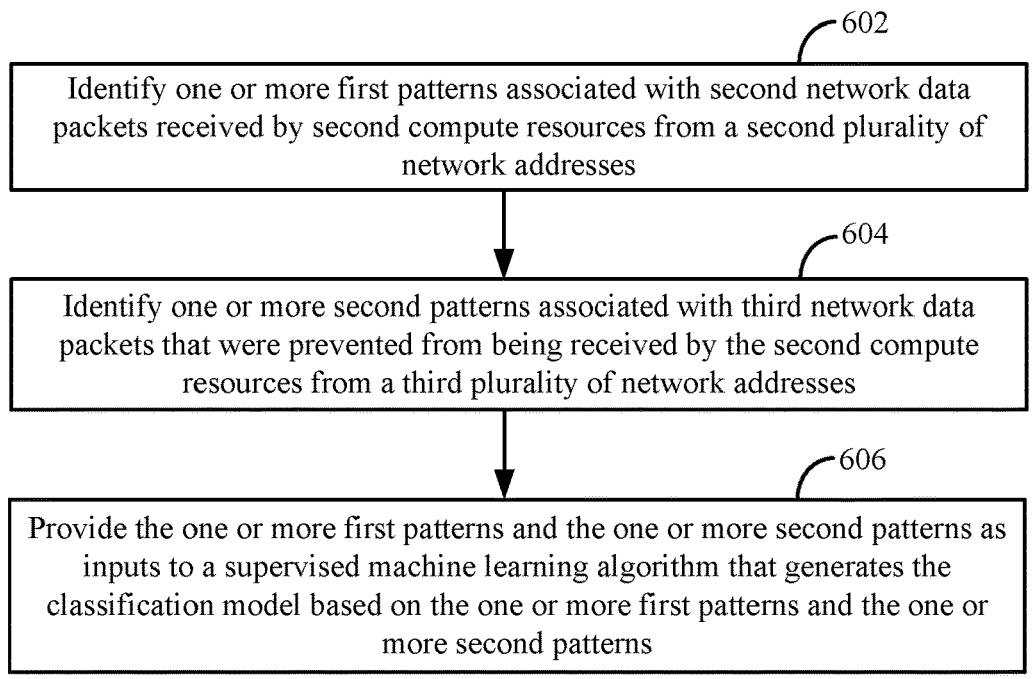
FIG. 6 depicts a flowchart of an example method for determining a classification model in accordance with an example embodiment.

FIG. 6 depicts a flowchart 600 of an example method for determining a classification model in accordance with an example embodiment. The method of flowchart 600 will now be described with continued reference to system 200 of FIG. 2 and supervised machine learning algorithm 302 of FIG. 3, although the method is not limited to that implementation. Other structural and operational embodiments will be apparent to persons skilled in the relevant art(s) based on the discussion regarding flowchart 600 and system 200 of FIG. 2 and supervised machine learning algorithm 302 of FIG. 3.

As shown in FIG. 6, the method of flowchart 600 begins at step 602, in which, first pattern(s) associated with second network data packets received by second compute resources from a second plurality of network addresses is identified. For example, with reference to FIG. 2, network data traffic analyzer 202 may identify first pattern(s) associated with second network data packets received by second compute resources (e.g., associated with different users) from a second plurality of network addresses.

At step 604, second pattern(s) associated with third network data packets that were prevented from being received by the second compute resources from a third plurality of network addresses are identified. For example, with reference with FIG. 2, network data traffic analyzer 202 may identify second pattern(s) associated with third network data packets that were prevented from being received by the second compute resources (e.g., due to a well-configured firewall application) from a third plurality of network addresses.

At step 606, the first pattern(s) and the second pattern(s) are provide as inputs to a supervised machine learning algorithm that generates the classification model based on the first pattern(s) and the second pattern(s). For example, with reference to FIG. 3, positively-labeled data 306 (e.g., the first pattern(s)) and negatively-labeled data 308 (e.g., the second pattern(s)) are provided as inputs to supervised machine learning algorithm 302. The first pattern(s) are characteristic of non-malicious network data packets and the second pattern(s) are characteristic of malicious network data packets.

Figure 7:
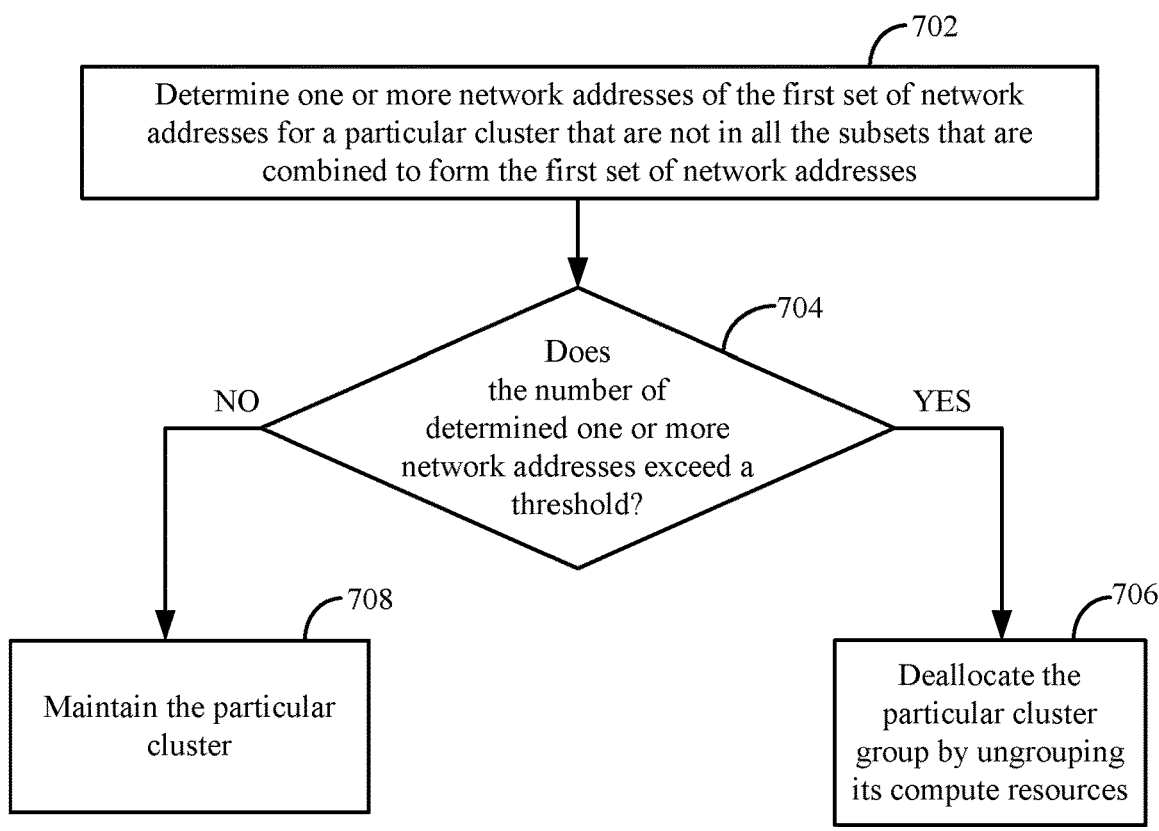
FIG. 7 depicts a flowchart of an example method for grouping compute resources into a cluster based on a number of "noisy" network addresses in accordance with an example embodiment.

FIG. 7 depicts a flowchart 700 of an example method for grouping compute resources into a cluster based on a number of "noisy" network addresses in accordance with an example embodiment. The method of flowchart 700 will now be described with continued reference to system 200 of FIG. 2, although the method is not limited to that implementation. Other structural and operational embodiments will be apparent to persons skilled in the relevant art(s) based on the discussion regarding flowchart 700 and system 200 of FIG. 2.

As shown in FIG. 7, the method of flowchart 700 begins at step 702, in which, network address(es) of the first set of network addresses for a particular cluster that are not in all the subsets that are combined to form the first set of network addresses are determined. For example, with reference to FIG. 2, compute resource grouper 204 determines network address(es) of the first set of network addresses for a particular cluster that are not in all the subsets that are combined to form the first set of network addresses.

At step 704, a determination is made as to whether the number of determined network address(es) exceeds a threshold. If a determination is made that the number of determined network address(es) exceeds the threshold, flow continues to step 706. Otherwise, flow continues to step 708. For example, with reference to FIG. 2, compute resource grouper 204 determines whether the number of determined network address(es) exceeds the threshold.

At step 706, the particular cluster is deallocated by ungrouping its compute resources. For example, with reference to FIG. 2, compute resource grouper 204 may deallocate the particular cluster by ungrouping its compute resources.

At step 708, the particular cluster is maintained. For example, with reference to FIG. 2, compute resource grouper 204 maintains the particular cluster.

Figure 8:
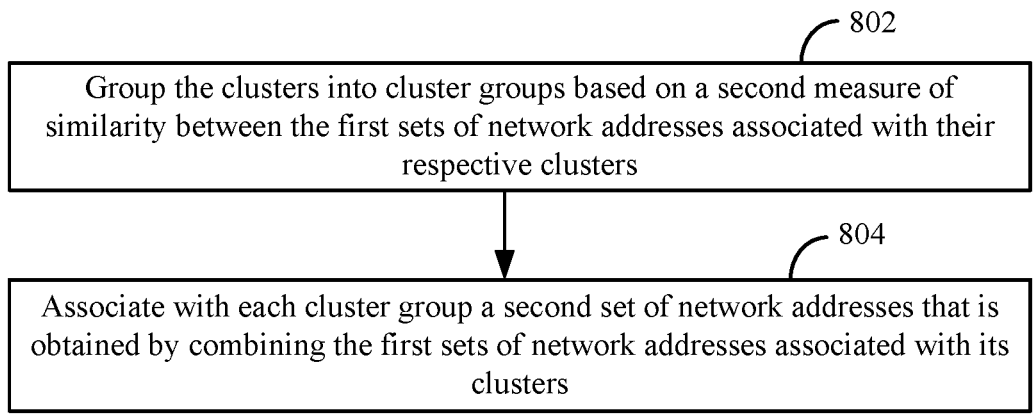
FIG. 8 depicts a flowchart of an example method for grouping clusters of compute resources into cluster groups in accordance with an example embodiment.

In accordance with one or more embodiments, clusters may be further grouped into cluster groups. For example, FIG. 8 depicts a flowchart 800 of an example method for grouping clusters of compute resources into cluster groups in accordance with an example embodiment. The method of flowchart 800 will now be described with continued reference to system 200 of FIG. 2, although the method is not limited to that implementation. Other structural and operational embodiments will be apparent to persons skilled in the relevant art(s) based on the discussion regarding flowchart 800 and system 200 of FIG. 2.

As shown in FIG. 8, the method of flowchart 800 begins at step 802, in which, clusters are grouped into cluster groups based on a second measure of similarity between the first sets of network addresses associated with their respective clusters. For example, with reference to FIG. 2, compute resource grouper 204 may group clusters into cluster groups based on a second measure of similarity between the first sets of network addresses associated with their respective clusters. For instance, with reference to FIG. 4C, compute resource grouper 204 may group clusters 410 and 412 into cluster group 414 based on a second measure of similarity between the first sets of network addresses associated with their respective clusters (e.g., network addresses A-E of cluster 410 and network addresses E-I of cluster 412).

In accordance with one or more embodiments, clusters are grouped into cluster groups based on whether the number of network addresses in the first sets of network addresses that are the same or within the second distance metric exceeds a threshold. For example, with reference to FIG. 2, compute resource grouper 204 may group clusters into cluster groups based on whether the number of network addresses in the first sets of network addresses that are the same or within the second distance metric exceeds a threshold.

At step 804, each cluster group is associated with a second set of network addresses that is obtained by combining the first sets of network addresses associated with its clusters. For example, with reference to FIG. 2, compute resource grouper 204 may associate each cluster group with a second set of network addresses that is obtained by combining the first sets of networks addresses associated with its clusters. For instance, with reference to FIG. 4C, compute resource grouper 204 may associate cluster group 414 with network addresses A-I (which is obtained by combining network addresses A-E with network addresses E-I).

In accordance with one or more embodiments, the clusters may be grouped into cluster groups based on the number of "noisy" network addresses associated with its respective clusters. Additional details regarding such a grouping technique is described below with reference to FIG. 9.

Figure 9:
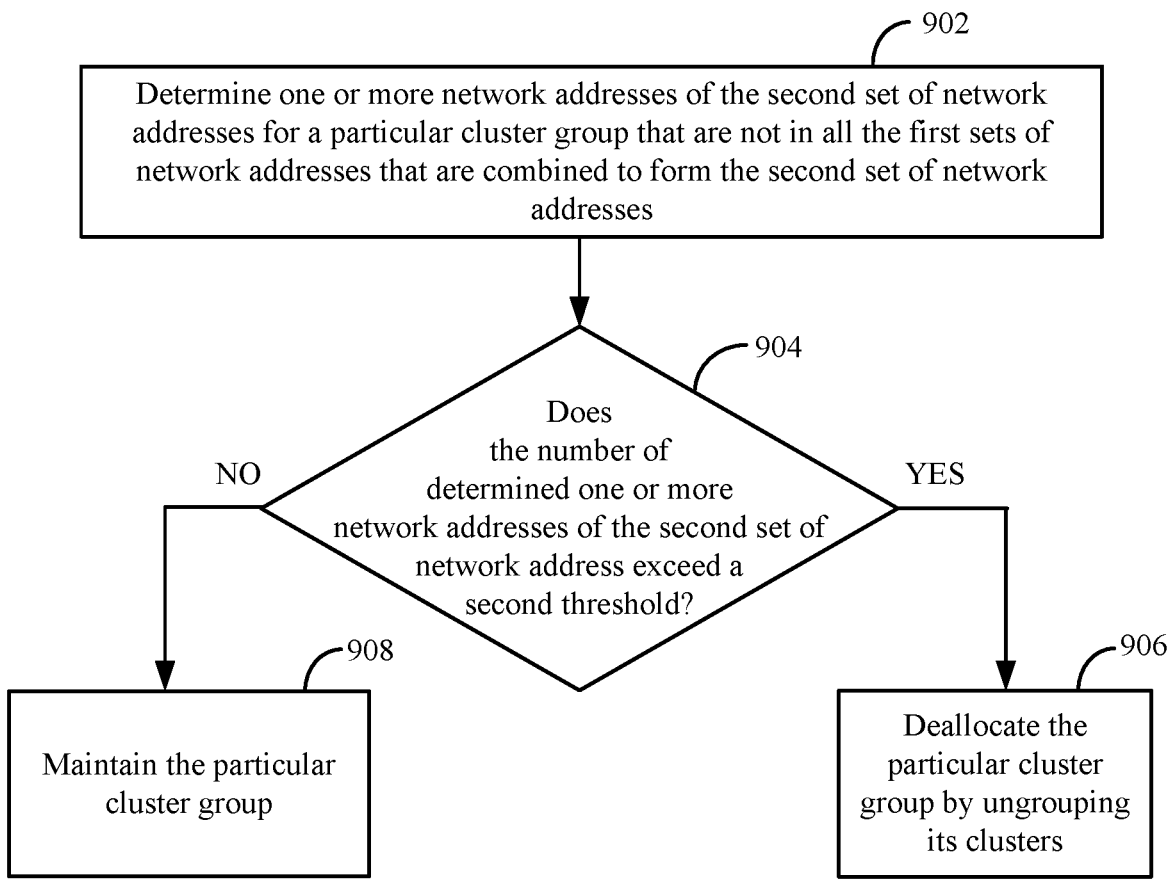
FIG. 9 depicts a flowchart of an example method for grouping clusters into a cluster group based on a number of "noisy" network addresses in accordance with an example embodiment.

FIG. 9 depicts a flowchart 900 of an example method for grouping clusters into a cluster group based on a number of "noisy" network addresses in accordance with an example embodiment. The method of flowchart 900 will now be described with continued reference to system 200 of FIG. 2, although the method is not limited to that implementation. Other structural and operational embodiments will be apparent to persons skilled in the relevant art(s) based on the discussion regarding flowchart 900 and system 200 of FIG. 2.

As shown in FIG. 9, the method of flowchart 900 begins at step 902, in which, network address(es) of the second set of network addresses for a particular cluster group that are not in all the first sets of network addresses that are combined to form the second set of network addresses are determined. For example, with reference to FIG. 2, compute resource grouper 204 determines network address(es) of the second set of network addresses for a particular cluster group that are not in all the first sets of network addresses that are combined to form the second set of network addresses.

At step 904, a determination is made as to whether the number of determined network address(es) of the second set of network addresses exceeds a threshold. If a determination is made that the number of determined network address(es) of the second set of network addresses exceeds the threshold, flow continues to step 906. Otherwise, flow continues to step 908. For example, with reference to FIG. 2, compute resource grouper 204 determines whether the number of determined network address(es) of the second set of network addresses exceeds the threshold.

At step 906, the particular cluster group is deallocated by ungrouping its clusters. For example, with reference to FIG. 2, compute resource grouper 204 may deallocate the particular cluster group by ungrouping its clusters.

At step 908, the particular cluster group is maintained. For example, with reference to FIG. 2, compute resource grouper 204 maintains the particular cluster group.

III. Example Computer System Implementation

The systems and methods described above, may be implemented in hardware, or hardware combined with one or both of software and/or firmware. For example, compute resource(s) 110, firewall application(s) 112, packet monitor 116, tag determiner 114, tag determiner 214, network data traffic analyzer 202, compute resource grouper 204, tag recommender 210, classification model 212, compute resource(s) 224, firewall application(s) 226, packet monitor 228, supervised machine learning algorithm 302, classification model 310, and/or flowchart 500, flowchart 600, flowchart 700, flowchart 800 and/or flowchart 900 may be implemented as computer program code/instructions configured to be executed in one or more processors and stored in a computer readable storage medium. Alternatively, compute resource(s) 110, firewall application(s) 112, packet monitor 116, tag determiner 114, tag determiner 214, network data traffic analyzer 202, compute resource grouper 204, tag recommender 210, classification model 212, compute resource(s) 224, firewall application(s) 226, packet monitor 228, supervised machine learning algorithm 302, classification model 310, and/or flowchart 500, flowchart 600, flowchart 700, flowchart 800 and/or flowchart 900 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
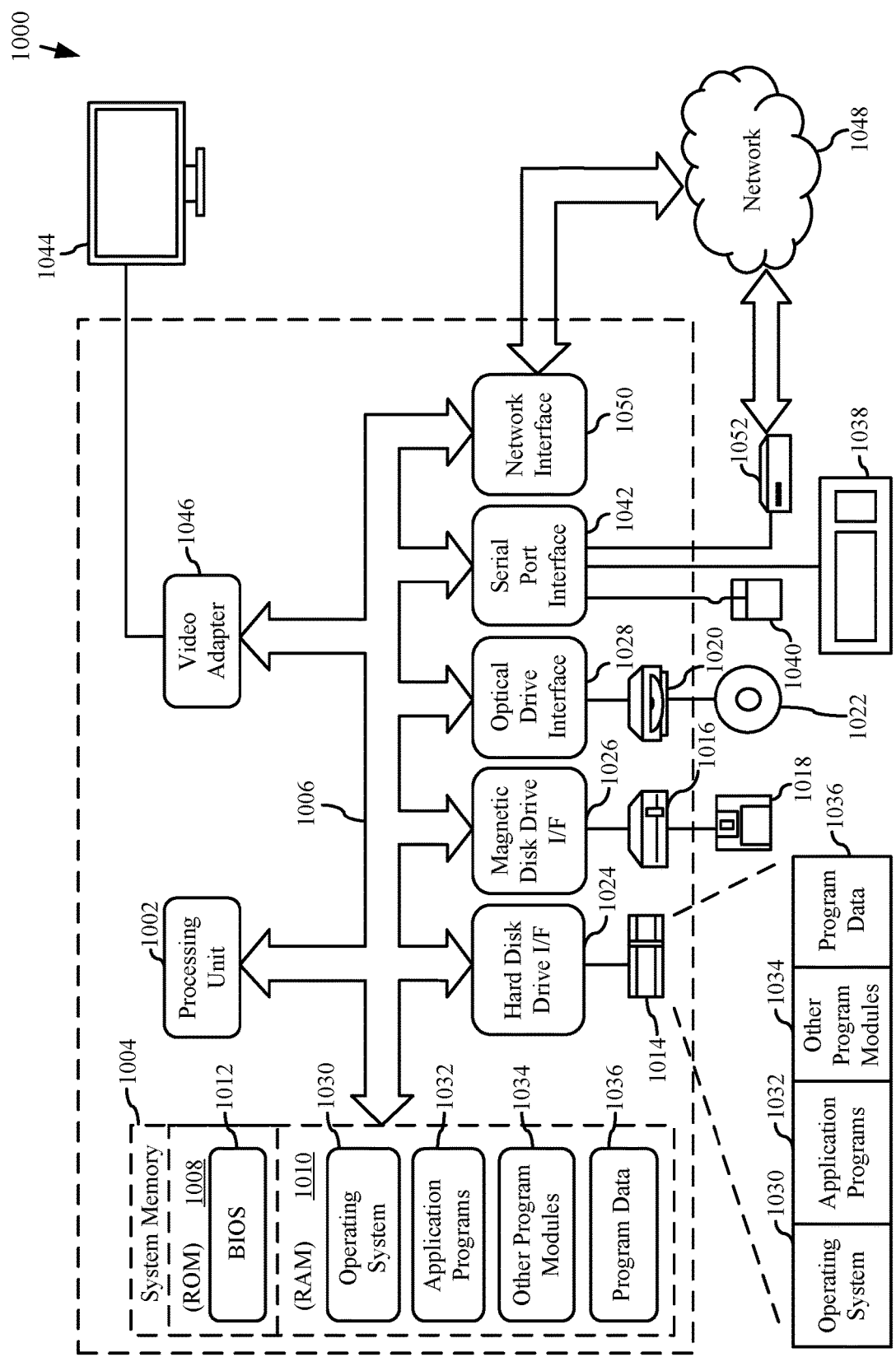
FIG. 10 is a block diagram of an example computing device that may be used to implement embodiments.

Furthermore, FIG. 10 depicts an exemplary implementation of a computing device 1000 in which embodiments may be implemented, including compute resource(s) 110, firewall application(s) 112, packet monitor 116, tag determiner 114, tag determiner 214, network data traffic analyzer 202, compute resource grouper 204, tag recommender 210, classification model 212, compute resource(s) 224, firewall application(s) 226, packet monitor 228, supervised machine learning algorithm 302, classification model 310, and/or flowchart 500, flowchart 600, flowchart 700, flowchart 800 and/or flowchart 900.

The description of computing device 1000 provided herein is provided for purposes of illustration, and is not intended to be limiting. Embodiments may be implemented in further types of computer systems, as would be known to persons skilled in the relevant art(s).

As shown in FIG. 10, computing device 1000 includes one or more processors, referred to as processor circuit 1002, a system memory 1004, and a bus 1006 that couples various system components including system memory 1004 to processor circuit 1002. Processor circuit 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1002 may execute program code stored in a computer readable medium, such as program code of operating system 1030, application programs 1032, other programs 1034, etc. Bus 1006 represents one or more of any of several types of bus structures, including a memory bus or memory controller, a peripheral bus, an accelerated graphics port, and a processor or local bus using any of a variety of bus architectures. System memory 1004 includes read only memory (ROM) 1008 and random access memory (RAM) 1010. A basic input/output system 1012 (BIOS) is stored in ROM 1008.

Computing device 1000 also has one or more of the following drives: a disk drive 1014 for reading from and writing to a hard disk or a solid state drive, a magnetic disk drive 1016 for reading from or writing to a removable magnetic disk 1018, and an optical disk drive 1020 for reading from or writing to a removable optical disk 1022 such as a CD ROM, DVD ROM, or other optical media. Hard disk drive 1014, magnetic disk drive 1016, and optical disk drive 1020 are connected to bus 1006 by a hard disk drive interface 1024, a magnetic disk drive interface 1026, and an optical drive interface 1028, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1030, one or more application programs 1032, other programs 1034, and program data 1036. Application programs 1032 or other programs 1034 may include, for example, computer program logic (e.g., computer program code or instructions) for implementing the systems described above, including the techniques for securing network-based compute resources described above in reference to FIGS. 1-9.

A user may enter commands and information into the computing device 1000 through input devices such as keyboard 1038 and pointing device 1040. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1002 through a serial port interface 1042 that is coupled to bus 1006, but may be connected by other interfaces, such as a parallel port, game port, or a universal serial bus (USB).

A display screen 1044 is also connected to bus 1006 via an interface, such as a video adapter 1046. Display screen 1044 may be external to, or incorporated in computing device 1000. Display screen 1044 may display information, as well as being a user interface for receiving user commands and/or other information (e.g., by touch, finger gestures, virtual keyboard, etc.). In addition to display screen 1044, computing device 1000 may include other peripheral output devices (not shown) such as speakers and printers.

Computing device 1000 is connected to a network 1048 (e.g., the Internet) through an adaptor or network interface 1050, a modem 1052, or other means for establishing communications over the network. Modem 1052, which may be internal or external, may be connected to bus 1006 via serial port interface 1042, as shown in FIG. 10, or may be connected to bus 1006 using another interface type, including a parallel interface.

As used herein, the terms "computer program medium," "computer-readable medium," and "computer-readable storage medium" are used to generally refer to physical hardware media such as the hard disk associated with hard disk drive 1014, removable magnetic disk 1018, removable optical disk 1022, other physical hardware media such as RAMs, ROMs, flash memory cards, digital video disks, zip disks, MEMs, nanotechnology-based storage devices, and further types of physical/tangible hardware storage media (including system memory 1004 of FIG. 10). Such computer-readable storage media are distinguished from and non-overlapping with communication media (do not include communication media or modulated data signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1032 and other programs 1034) may be stored on the hard disk, magnetic disk, optical disk, ROM, RAM, or other hardware storage medium. Such computer programs may also be received via network interface 1050, serial port interface 1042, or any other interface type. Such computer programs, when executed or loaded by an application, enable computing device 1000 to implement features of embodiments discussed herein. Accordingly, such computer programs represent controllers of the computing device 1000.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

Embodiments described herein may also be implemented and/or executed via virtual or emulated hardware (e.g., virtual machines) and/or other environments, including, but not limited to, a cloud-computing based environment (e.g., Microsoft Azure by Microsoft Corporation®)).

IV. Additional Exemplary Embodiments

A method is described herein. The method includes, for each of a plurality of compute resources: analyzing network data packets received by the compute resource from a plurality of network addresses based on a classification model to determine a subset of the plurality of network addresses that are non-malicious; grouping the plurality of compute resources into clusters based on a first measure of similarity between the network addresses associated with their respective subsets; associating with each cluster a first set of network addresses that is obtained by combining the subsets associated with its compute resources; and outputting a tag that represents at least one of the first sets of network addresses, the tag being suitable for use in configuring a firewall application to allow access by the at least one of the first sets of network addresses to the plurality of compute resources.

In an embodiment of the method, the first measure of similarity is based on a number of network addresses in the subsets that are the same or within a distance metric, wherein said grouping comprises: grouping the plurality of compute resources into clusters based on whether the number of network addresses in the subsets that are the same or within the distance metric exceeds a threshold.

In an embodiment of the method, said grouping the plurality of compute resources into clusters based on the first measure of similarity between the network addresses associated with their respective subsets comprises: determining one or more network addresses of the first set of network addresses for a particular cluster that are not in all the subsets that are combined to form the first set of network addresses; determining whether a number of the determined one or more network addresses exceeds a threshold; in response to determining that the number of the determined one or more network addresses exceeds the threshold, deallocating the particular cluster group by ungrouping its compute resources; and in response to determining that the number of the determined one or more network addresses does not exceed the threshold, maintaining the particular cluster.

In an embodiment of the method, the method further comprises: grouping the clusters into cluster groups based on a second measure of similarity between the first sets of network addresses associated with their respective clusters; and associating with each cluster group a second set of network addresses that is obtained by combining the first sets of network addresses associated with its clusters, wherein the tag represents the second set of network addresses, the tag being suitable for use in configuring the firewall application to allow access by the second set of network addresses to the plurality of compute resources.

In an embodiment of the method, the second measure of similarity is based on a number of network addresses in the first sets of network addresses that are the same or within a second distance metric, wherein said grouping comprises: grouping the clusters into cluster groups based on whether the number of network addresses in the first sets of network addresses that are the same or within the second distance metric exceeds a threshold.

In an embodiment of the method, said grouping the clusters into cluster groups based on the second measure of similarity between the first sets of network addresses associated with their respective clusters comprises: determining one or more network addresses of the second set of network addresses for a particular cluster group that are not in all the first sets of network addresses that are combined to form the second set of network addresses; determining whether a number of the determined one or more network addresses of the second set of network addresses exceeds a second threshold; in response to determining that the number of the determined one or more network addresses of the second set of network addresses exceeds the second threshold, deallocating the particular cluster group by ungrouping its clusters; and in response to determining that the number of the determined one or more network addresses of the second set of network addresses does not exceed the threshold, maintaining the particular cluster group.

In an embodiment of the method, the classification model is determined based on: identifying one or more first patterns associated with second network data packets received by second compute resources from a second plurality of network addresses; identifying one or more second patterns associated with third network data packets that were prevented from being received by the second compute resources from a third plurality of network addresses; and providing the one or more first patterns and the one or more second patterns as inputs to a supervised machine learning algorithm that generates the classification model based on the one or more first patterns and the one or more second patterns, the one or more first patterns being characteristic of non-malicious network data packets and the one or more second patterns being characteristic of malicious network data packets.

In an embodiment of the method, said analyzing network data packets received by the compute resource from the plurality of network addresses based on the classification model to determine the subset of the plurality of network addresses that are non-malicious comprises: determining one or more features associated with each of the plurality of network addresses based on the analysis of network data packets; providing the one or more features to the classification model; and receiving an output generated by the classification model that indicates whether each of the plurality of network addresses is non-malicious or malicious based on the one or more features.

A computing device is also described herein. The compute device includes at least one processor circuit and at least one memory that stores program code configured to be executed by the at least one processor circuit, the program code comprising: a network data traffic analyzer configured to: for each of a plurality of compute resources: analyze network data packets received by the compute resource from a plurality of network addresses based on a classification model to determine a subset of the plurality of network addresses that are non-malicious; a compute resource grouper configured to: group the plurality of compute resources into clusters based on a first measure of similarity between the network addresses associated with their respective subsets; and associate with each cluster a first set of network addresses that is obtained by combining the subsets associated with its compute resources; and a tag recommender configured to: output a tag that represents at least one of the first sets of network addresses, the tag being suitable for use in configuring a firewall application to allow access by the at least one of the first sets of network addresses to the plurality of compute resources.

In an embodiment of the computing device, the first measure of similarity is based on a number of network addresses in the subsets that are the same or within a distance metric, wherein the compute resource grouper is configured to: group the plurality of compute resources into clusters based on whether the number of network addresses in the subsets that are the same or within the distance metric exceeds a threshold.

In an embodiment of the computing device, the compute resource grouper is configured to group the plurality of compute resources into clusters based on the first measure of similarity between the network addresses associated with their respective subsets by: determining one or more network addresses of the first set of network addresses for a particular cluster that are not in all the subsets that are combined to form the first set of network addresses; determining whether a number of the determined one or more network addresses exceeds a threshold; in response to determining that the number of the determined one or more network addresses exceeds the threshold, deallocating the particular cluster group by ungrouping its compute resources; and in response to determining that the number of the determined one or more network addresses does not exceed the threshold, maintaining the particular cluster.

In an embodiment of the computing device, the compute resource grouper is further configured to: group the clusters into cluster groups based on a second measure of similarity between the first sets of network addresses associated with their respective clusters; and associate with each cluster group a second set of network addresses that is obtained by combining the first sets of network addresses associated with its clusters, wherein the tag represents the second set of network addresses, the tag being suitable for use in configuring the firewall application to allow access by the second set of network addresses to the plurality of compute resources.

In an embodiment of the computing device, the second measure of similarity is based on a number of network addresses in the first sets of network addresses that are the same or within a second distance metric, wherein the compute resource grouper is further configured to: group the clusters into cluster groups based on whether the number of network addresses in the first sets of network addresses that are the same or within the second distance metric exceeds a threshold.

In an embodiment of the computing device, the compute resource grouper is configured to group the clusters into cluster groups based on the second measure of similarity between the first sets of network addresses associated with their respective clusters by: determining one or more network addresses of the second set of network addresses for a particular cluster group that are not in all the first sets of network addresses that are combined to form the second set of network addresses; determining whether a number of the determined one or more network addresses of the second set of network addresses exceeds a second threshold; in response to determining that the number of the determined one or more network addresses of the second set of network addresses exceeds the second threshold, deallocating the particular cluster group by ungrouping its clusters; and in response to determining that the number of the determined one or more network addresses of the second set of network addresses does not exceed the threshold, maintaining the particular cluster group.

In an embodiment of the computing device, the network data traffic analyzer is configured to determine the classification model based on: identifying one or more first patterns associated with second network data packets received by second compute resources from a second plurality of network addresses; identifying one or more second patterns associated with third network data packets that were prevented from being received by the second compute resources from a third plurality of network addresses; and providing the one or more first patterns and the one or more second patterns as inputs to a supervised machine learning algorithm that generates the classification model based on the one or more first patterns and the one or more second patterns, the one or more first patterns being characteristic of non-malicious network data packets and the one or more second patterns being characteristic of malicious network data packets.

In an embodiment of the computing device, the network data traffic analyzer is configured to analyze network data packets received by the compute resource from the plurality of network addresses based on the classification model to determine the subset of the plurality of network addresses that are non-malicious by: determining one or more features associated with each of the plurality of network addresses based on the analysis of network data packets; providing the one or more features to the classification model; and receiving an output generated by the classification model that indicates whether each of the plurality of network addresses is non-malicious or malicious based on the one or more features.

A computer-readable storage medium having program instructions recorded thereon that, when executed by at least one processor, perform a method is further described herein. The method includes, for each of a plurality of compute resources: analyzing network data packets received by the compute resource from a plurality of network addresses based on a classification model to determine a subset of the plurality of network addresses that are non-malicious; grouping the plurality of compute resources into clusters based on a first measure of similarity between the network addresses associated with their respective subsets; associating with each cluster a first set of network addresses that is obtained by combining the subsets associated with its compute resources; and outputting a tag that represents at least one of the first sets of network addresses, the tag being suitable for use in configuring a firewall application to allow access by the at least one of the first sets of network addresses to the plurality of compute resources.

In an embodiment of the computer-readable storage medium, the first measure of similarity is based on a number of network addresses in the subsets that are the same or within a distance metric, wherein said grouping comprises: grouping the plurality of compute resources into clusters based on whether the number of network addresses in the subsets that are the same or within the distance metric exceeds a threshold.

In an embodiment of the computer-readable storage medium, said grouping the plurality of compute resources into clusters based on the first measure of similarity between the network addresses associated with their respective subsets comprises: determining one or more network addresses of the first set of network addresses for a particular cluster that are not in all the subsets that are combined to form the first set of network addresses; determining whether a number of the determined one or more network addresses exceeds a threshold; in response to determining that the number of the determined one or more network addresses exceeds the threshold, deallocating the particular cluster group by ungrouping its compute resources; and in response to determining that the number of the determined one or more network addresses does not exceed the threshold, maintaining the particular cluster.

In an embodiment of the computer-readable storage medium, the method further comprises: grouping the clusters into cluster groups based on a second measure of similarity between the first sets of network addresses associated with their respective clusters; and associating with each cluster group a second set of network addresses that is obtained by combining the first sets of network addresses associated with its clusters, wherein the tag represents the second set of network addresses, the tag being suitable for use in configuring the firewall application to allow access by the second set of network addresses to the plurality of compute resources.

V. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A method, comprising:

for each of a plurality of compute resources:
analyzing network data packets received by the compute resource from a plurality of network addresses based on a classification model to determine a subset of the plurality of network addresses that are non-malicious;

grouping the plurality of compute resources into clusters based on a first measure of similarity between the network addresses associated with their respective subsets;

associating with each cluster a first set of network addresses that is obtained by combining the subsets associated with its compute resources; and outputting a tag that represents at least one of the first sets of network addresses, the tag being suitable for use in configuring a firewall application to allow access by the at least one of the first sets of network addresses to the plurality of compute resources.

2. The method of claim 1, wherein the first measure of similarity is based on a number of network addresses in the subsets that are the same or within a distance metric, wherein said grouping comprises:

grouping the plurality of compute resources into clusters based on whether the number of network addresses in the subsets that are the same or within the distance metric exceeds a threshold.

3. The method of claim 1, wherein said grouping the plurality of compute resources into clusters based on the first measure of similarity between the network addresses associated with their respective subsets comprises:

determining one or more network addresses of the first set of network addresses for a particular cluster that are not in all the subsets that are combined to form the first set of network addresses;

determining whether a number of the determined one or more network addresses exceeds a threshold;

in response to determining that the number of the determined one or more network addresses exceeds the threshold, deallocating the particular cluster group by ungrouping its compute resources; and in response to determining that the number of the determined one or more network addresses does not exceed the threshold, maintaining the particular cluster.

4. The method of claim 1, further comprising:
grouping the clusters into cluster groups based on a second measure of similarity between the first sets of network addresses associated with their respective clusters; and
associating with each cluster group a second set of network addresses that is obtained by combining the first sets of network addresses associated with its clusters, wherein the tag represents the second set of network addresses, the tag being suitable for use in configuring the firewall application to allow access by the second set of network addresses to the plurality of compute resources.

5. The method of claim 4, wherein the second measure of similarity is based on a number of network addresses in the first sets of network addresses that are the same or within a second distance metric, wherein said grouping comprises:
grouping the clusters into cluster groups based on whether the number of network addresses in the first sets of network addresses that are the same or within the second distance metric exceeds a threshold.

6. The method of claim 4, wherein said grouping the clusters into cluster groups based on the second measure of similarity between the first sets of network addresses associated with their respective clusters comprises:
determining one or more network addresses of the second set of network addresses for a particular cluster group that are not in all the first sets of network addresses that are combined to form the second set of network addresses;
determining whether a number of the determined one or more network addresses of the second set of network addresses exceeds a second threshold;
in response to determining that the number of the determined one or more network addresses of the second set of network addresses exceeds the second threshold, deallocating the particular cluster group by ungrouping its clusters; and
in response to determining that the number of the determined one or more network addresses of the second set of network addresses does not exceed the threshold, maintaining the particular cluster group.

7. The method of claim 1, wherein the classification model is determined based on:
identifying one or more first patterns associated with second network data packets received by second compute resources from a second plurality of network addresses;
identifying one or more second patterns associated with third network data packets that were prevented from being received by the second compute resources from a third plurality of network addresses; and
providing the one or more first patterns and the one or more second patterns as inputs to a supervised machine learning algorithm that generates the classification model based on the one or more first patterns and the one or more second patterns, the one or more first patterns being characteristic of non-malicious network data packets and the one or more second patterns being characteristic of malicious network data packets.

8. The method of claim 1, wherein said analyzing network data packets received by the compute resource from the plurality of network addresses based on the classification model to determine the subset of the plurality of network addresses that are non-malicious comprises:
determining one or more features associated with each of the plurality of network addresses based on the analysis of network data packets;
providing the one or more features to the classification model; and
receiving an output generated by the classification model that indicates whether each of the plurality of network addresses is non-malicious or malicious based on the one or more features.

9. A computing device, comprising:
at least one processor circuit; and
at least one memory that stores program code configured to be executed by the at least one processor circuit, the program code comprising:
a network data traffic analyzer configured to:
for each of a plurality of compute resources:
analyze network data packets received by the compute resource from a plurality of network addresses based on a classification model to determine a subset of the plurality of network addresses that are non-malicious;
a compute resource grouper configured to:
group the plurality of compute resources into clusters based on a first measure of similarity between the network addresses associated with their respective subsets; and
associate with each cluster a first set of network addresses that is obtained by combining the subsets associated with its compute resources; and
a tag recommender configured to:
output a tag that represents at least one of the first sets of network addresses, the tag being suitable for use in configuring a firewall application to allow access by the at least one of the first sets of network addresses to the plurality of compute resources.

10. The computing device of claim 9, wherein the first measure of similarity is based on a number of network addresses in the subsets that are the same or within a distance metric, wherein the compute resource grouper is configured to:
group the plurality of compute resources into clusters based on whether the number of network addresses in the subsets that are the same or within the distance metric exceeds a threshold.

11. The computing device of claim 9, wherein the compute resource grouper is configured to group the plurality of compute resources into clusters based on the first measure of similarity between the network addresses associated with their respective subsets by:
determining one or more network addresses of the first set of network addresses for a particular cluster that are not in all the subsets that are combined to form the first set of network addresses;
determining whether a number of the determined one or more network addresses exceeds a threshold;
in response to determining that the number of the determined one or more network addresses exceeds the threshold, deallocating the particular cluster group by ungrouping its compute resources; and
in response to determining that the number of the determined one or more network addresses does not exceed the threshold, maintaining the particular cluster.

12. The computing device of claim 9, wherein the compute resource grouper is further configured to:
  group the clusters into cluster groups based on a second measure of similarity between the first sets of network addresses associated with their respective clusters; and
  associate with each cluster group a second set of network addresses that is obtained by combining the first sets of network addresses associated with its clusters, wherein the tag represents the second set of network addresses, the tag being suitable for use in configuring the firewall application to allow access by the second set of network addresses to the plurality of compute resources.

13. The computing device of claim 12, wherein the second measure of similarity is based on a number of network addresses in the first sets of network addresses that are the same or within a second distance metric, wherein the compute resource grouper is further configured to:
  group the clusters into cluster groups based on whether the number of network addresses in the first sets of network addresses that are the same or within the second distance metric exceeds a threshold.

14. The computing device of claim 12, wherein the compute resource grouper is configured to group the clusters into cluster groups based on the second measure of similarity between the first sets of network addresses associated with their respective clusters by:
  determining one or more network addresses of the second set of network addresses for a particular cluster group that are not in all the first sets of network addresses that are combined to form the second set of network addresses;
  determining whether a number of the determined one or more network addresses of the second set of network addresses exceeds a second threshold;
  in response to determining that the number of the determined one or more network addresses of the second set of network addresses exceeds the second threshold, deallocating the particular cluster group by ungrouping its clusters; and
  in response to determining that the number of the determined one or more network addresses of the second set of network addresses does not exceed the threshold, maintaining the particular cluster group.

15. The computing device of claim 9, wherein the network data traffic analyzer is configured to determine the classification model based on:
  identifying one or more first patterns associated with second network data packets received by second compute resources from a second plurality of network addresses;
  identifying one or more second patterns associated with third network data packets that were prevented from being received by the second compute resources from a third plurality of network addresses; and
  providing the one or more first patterns and the one or more second patterns as inputs to a supervised machine learning algorithm that generates the classification model based on the one or more first patterns and the one or more second patterns, the one or more first patterns being characteristic of non-malicious network data packets and the one or more second patterns being characteristic of malicious network data packets.

16. The computing device of claim 9, wherein the network data traffic analyzer is configured to analyze network data packets received by the compute resource from the plurality of network addresses based on the classification model to determine the subset of the plurality of network addresses that are non-malicious by:
  determining one or more features associated with each of the plurality of network addresses based on the analysis of network data packets;
  providing the one or more features to the classification model; and
  receiving an output generated by the classification model that indicates whether each of the plurality of network addresses is non-malicious or malicious based on the one or more features.

17. A computer-readable storage medium having program instructions recorded thereon that, when executed by at least one processor, perform a method, the method comprising:
  for each of a plurality of compute resources:
    analyzing network data packets received by the compute resource from a plurality of network addresses based on a classification model to determine a subset of the plurality of network addresses that are non-malicious;
  grouping the plurality of compute resources into clusters based on a first measure of similarity between the network addresses associated with their respective subsets;
  associating with each cluster a first set of network addresses that is obtained by combining the subsets associated with its compute resources; and
  outputting a tag that represents at least one of the first sets of network addresses, the tag being suitable for use in configuring a firewall application to allow access by the at least one of the first sets of network addresses to the plurality of compute resources.

18. The computer-readable storage medium of claim 17, wherein the first measure of similarity is based on a number of network addresses in the subsets that are the same or within a distance metric, wherein said grouping comprises:
  grouping the plurality of compute resources into clusters based on whether the number of network addresses in the subsets that are the same or within the distance metric exceeds a threshold.

19. The computer-readable storage medium of claim 17, wherein said grouping the plurality of compute resources into clusters based on the first measure of similarity between the network addresses associated with their respective subsets comprises:
  determining one or more network addresses of the first set of network addresses for a particular cluster that are not in all the subsets that are combined to form the first set of network addresses;
  determining whether a number of the determined one or more network addresses exceeds a threshold;
  in response to determining that the number of the determined one or more network addresses exceeds the threshold, deallocating the particular cluster group by ungrouping its compute resources; and
  in response to determining that the number of the determined one or more network addresses does not exceed the threshold, maintaining the particular cluster.

20. The computer-readable storage medium of claim 17, the method further comprising:
  grouping the clusters into cluster groups based on a second measure of similarity between the first sets of network addresses associated with their respective clusters; and
  associating with each cluster group a second set of network addresses that is obtained by combining the first sets of network addresses associated with its clusters, wherein the tag represents the second set of network addresses, the tag being suitable for use in configuring the firewall application to allow access by the second set of network addresses to the plurality of compute resources.

* * * * *